United States Patent
Stimm et al.

(10) Patent No.: US 12,056,846 B2
(45) Date of Patent: *Aug. 6, 2024

(54) APPARATUS AND METHODS FOR NON-UNIFORM DOWNSAMPLING OF CAPTURED PANORAMIC IMAGES

(71) Applicant: GoPro, Inc., San Mateo, CA (US)

(72) Inventors: Daryl Stimm, San Mateo, CA (US); David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,085

(22) Filed: Jul. 14, 2023

(65) Prior Publication Data
US 2023/0360172 A1    Nov. 9, 2023

Related U.S. Application Data

(63) Continuation of application No. 17/960,017, filed on Oct. 4, 2022, now Pat. No. 11,776,089, which is a
(Continued)

(51) Int. Cl.
*G06T 3/40* (2024.01)
*G06T 3/4038* (2024.01)
(Continued)

(52) U.S. Cl.
CPC ......... *G06T 3/4038* (2013.01); *H04N 7/0117* (2013.01); *H04N 23/698* (2023.01); *H04N 19/196* (2014.11)

(58) Field of Classification Search
None
See application file for complete search history.

(56) References Cited

U.S. PATENT DOCUMENTS 10,075,701 B2 * 9/2018 Cole .................... H04N 21/437
10,878,536 B1   12/2020 Stimm
(Continued)

OTHER PUBLICATIONS

Messner, "Differential Micropone Arrays, Master Thesis," Graz University of Technology, Dec. 10, 2013, 102 pages.

*Primary Examiner* — Daniel T Tekle
(74) *Attorney, Agent, or Firm* — Young Basile Hanlon & MacFarlane, P.C.

(57) ABSTRACT

Apparatus and methods for the non-uniform downsampling of captured panoramic images. In one embodiment, a computing device is disclosed that includes a processing apparatus and a non-transitory computer readable apparatus comprising a storage medium have one or more instructions stored thereon. The one or more instructions, when executed by the processing apparatus, being configured to: receive captured images, the captured images obtained using two or more image sensors; non-uniformly downsample the received captured images; and encode the non-uniformly downsampled images. In some variants, the non-uniformly downsampled images take into account a desired area of interest within the captured images. In some implementations, the computing device includes an image capture device. Methods and non-transitory computer readable apparatus are also disclosed.

20 Claims, 9 Drawing Sheets

Related U.S. Application Data continuation of application No. 17/132,379, filed on Dec. 23, 2020, now Pat. No. 11,494,874, which is a continuation of application No. 16/235,866, filed on Dec. 28, 2018, now Pat. No. 10,878,536.

(60) Provisional application No. 62/612,041, filed on Dec. 29, 2017.

(51) Int. Cl.
*H04N 7/01* (2006.01)
*H04N 23/698* (2023.01)
*H04N 19/196* (2014.01)

(56) References Cited

U.S. PATENT DOCUMENTS

| | | |
|---|---|---|
| 11,494,874 B2 | 11/2022 | Stimm |
| 2013/0272391 A1 | 10/2013 | Zheng |
| 2015/0098663 A1* | 4/2015 | Heinke .................. H04N 5/33 382/284 |
| 2016/0050370 A1* | 2/2016 | Campbell ............ H04N 13/296 348/36 |
| 2019/0004535 A1* | 1/2019 | Huang ................. H04N 13/254 |
| 2019/0349471 A1 | 11/2019 | Ferguson |
| 2020/0051576 A1 | 2/2020 | Fukui |
| 2021/0067868 A1 | 3/2021 | Taghizadeh |
| 2021/0174470 A1 | 6/2021 | Stimm |
| 2022/0060821 A1 | 2/2022 | Dick |
| 2023/0023937 A1 | 1/2023 | Stimm |

* cited by examiner

APPARATUS AND METHODS FOR NON-UNIFORM DOWNSAMPLING OF CAPTURED PANORAMIC IMAGES

CROSS-REFERENCE TO RELATED APPLICATIONS

This application is a continuation of U.S. patent application Ser. No. 17/960,017, filed Oct. 4, 2022, which is a continuation of U.S. patent application Ser. No. 17/132,379, filed Dec. 23, 2020, now U.S. Pat. No. 11,494,874, which is a continuation of U.S. patent application Ser. No. 16/235,866, filed Dec. 28, 2018, now U.S. Pat. No. 10,878,536, which claims the benefit of priority to U.S. Provisional Patent Application Ser. No. 62/612,041 filed Dec. 29, 2017 and entitled "Methods and Apparatus for Re-Projection of Panoramic Content", the entire disclosures of which are hereby incorporated by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates generally to video image processing and in one exemplary aspect, to methods and apparatus for the non-uniform downsampling of captured panoramic images

BACKGROUND

Spherical images are typically obtained by capturing multiple images with overlapping fields of view from different cameras and combining ("stitching") these images together in order to provide a two-dimensional projection. Unfortunately, these captured panoramic images are not well-suited for use with traditional encoders/decoders. For example, the GoPro® Fusion camera system manufactured by the assignee hereof includes image sensors which natively capture at a 3100 pixel by 3000 pixel resolution. However, this native resolution image needs to be scaled (or downsampled) to a smaller size (e.g., 2704×2620) prior to being encoded. This scaling is performed uniformly (linearly) and is required in order to fit within standard line size limitations of, for example, H.264 encoders as well as for thermal or battery considerations of the camera system itself. Unfortunately, current downsampling techniques are not optimized for, inter alia, the stitching processes that need to be performed in order to properly re-project this captured content for display. In other words, this scaling (downsampling) of natively captured images means that image resolution is lost, which has the potential to adversely affect, inter alia, the quality of image stitching for captured panoramic images. Moreover, this deficiency present within traditional encoders/decoders is only expected to be exacerbated further as camera systems include image sensors that natively capture images at higher resolutions.

To these ends, techniques are needed to improve upon these conventional processing techniques in order to optimize image processing performance in view of the deficiencies known to exist with traditional encoders/decoders. Moreover, these optimizations should enable increased flexibility for users of this captured content.

SUMMARY

The present disclosure satisfies the foregoing needs by providing, inter alia, methods and apparatus for the non-uniform downsampling of captured images.

In one aspect, a computing device is disclosed. In one embodiment, the computing device includes a processing apparatus; and a non-transitory computer readable apparatus having a storage medium that includes one or more instructions stored thereon, the one or more instructions, when executed by the processing apparatus, being configured to: receive captured images, the captured images obtained using two or more image sensors; non-uniformly downsample the received captured images; and encode the non-uniformly downsampled images.

In one variant, two of the captured images each possess an overlapping field of view and a singular field of view, the non-uniform downsample of the received captured images includes a downsample of the singular field of view that is greater than a downsample of the overlapping field of view.

In another variant, the one or more instructions, when executed by the processing apparatus, are further configured to stitch the non-uniformly downsampled images.

In yet another variant, the one or more instructions, when executed by the processing apparatus, are further configured to transmit the encoded non-uniformly downsampled image via a network interface.

In yet another variant, the one or more instructions, when executed by the processing apparatus, are further configured to receive an indication of an area of interest within the captured images, the area of interest comprising a subset of the captured images; and the non-uniformly downsample of the received captured images is performed in accordance with the received indication.

In yet another variant, the non-uniform downsample of the received captured images includes a flattening of a resolution density curve associated with the captured images.

In yet another variant, the non-uniform downsample of the received captured images includes an increase in curvature of a resolution density curve associated with the captured images.

In yet another variant, the computing device includes a camera apparatus.

In another aspect, a method of encoding captured images is disclosed. In one embodiment, the method includes receiving the captured images, the captured images obtained using two or more image sensors; non-uniformly downsampling the received captured images; and encoding the non-uniformly downsampled images.

In one variant, two of the captured images each possess an overlapping field of view and a singular field of view, the non-uniform downsample of the received captured images includes a downsample of the singular field of view that is greater than a downsample of the overlapping field of view.

In another variant, the method further includes stitching the non-uniformly downsampled images.

In yet another variant, the method further includes transmitting the encoded non-uniformly downsampled image via a network interface.

In yet another variant, the method further includes receiving an indication of an area of interest within the captured images, the area of interest comprising a subset of the captured images; and performing the non-uniform downsampling of the captured images in accordance with the receiving of the indication.

In yet another variant, the non-uniform downsampling of the received captured images comprises a flattening of a resolution density curve associated with the captured images.

In yet another variant, the non-uniform downsampling of the received captured images includes increasing curvature of a resolution density curve associated with the captured images.

In yet another aspect, a non-transitory computer readable apparatus is disclosed. In one embodiment, the non-transitory computer readable apparatus includes a storage medium that has one or more instructions stored thereon, the one or more instructions, when executed by a processing apparatus, being configured to: receive captured images, the captured images obtained using two or more image sensors; non-uniformly downsample the received captured images; and encode the non-uniformly downsampled images.

In one variant, two of the captured images each possess an overlapping field of view and a singular field of view, the non-uniform downsample of the received captured images includes a downsample of the singular field of view that is greater than a downsample of the overlapping field of view.

In another variant, the one or more instructions, when executed by the processing apparatus, are further configured to stitch the non-uniformly downsampled images.

In yet another variant, the one or more instructions, when executed by the processing apparatus, are further configured to transmit the encoded non-uniformly downsampled image via a network interface.

In yet another variant, the one or more instructions, when executed by the processing apparatus, are further configured to receive an indication of an area of interest within the captured images, the area of interest comprising a subset of the captured images; and the non-uniformly downsample of the received captured images is performed in accordance with the received indication.

In yet another variant, the non-uniform downsample of the received captured images includes a flattening of a resolution density curve associated with the captured images.

In yet another aspect, a method for stitching non-uniformly downsampled images are disclosed.

In yet another aspect, an integrated circuit apparatus is disclosed. In one embodiment, the integrated circuit apparatus is configured to receive captured images, the captured images obtained using two or more image sensors; non-uniformly downsample the received captured images; and encode the non-uniformly downsampled images.

In yet another aspect, an image capture device that improves image resolution processing, the image capture device including an image sensor capturing an image having a resolution density curve which varies with a viewing angle relative to the image sensor and a processor. The processor configured to non-uniformly downsample the captured image via the resolution density curve by using more information at an area of interest in the image than at remaining areas in the image to improve the image resolution processing of the image by the image capture device and encode the non-uniformly downsampled image.

In one variant, an effective resolution of the non-uniformly downsampled image is less than an effective resolution of the captured image. In another variant, a curvature of the resolution density curve is increased relative to an initial curvature. In another variant, non-uniformly downsampling is applied symmetrically based on the area of interest. In another variant, non-uniformly downsampling is applied asymmetrically based on the area of interest. In another variant, the processor further configured to receive the area of interest in the image.

In yet another aspect, a device that improves image resolution processing, the device comprising a processor and a memory storing one or more instructions configured to be executed by the processor. The one or more instructions cause the processor to receive, from an image sensor, a captured image with an effective native resolution and a resolution density function related to a lens-image sensor geometry, non-uniformly scale the captured image using the resolution density function to improve the image resolution processing of the image by the image capture device, wherein more information is used at an area of interest in the image than at remaining areas in the image, and encode the non-uniformly scaled image.

In one variant, an effective resolution of the non-uniformly scaled image is less than an effective resolution of the captured image. In another variant, a curvature of the resolution density curve is increased relative to an initial curvature. In another variant, non-uniformly scaling is applied symmetrically based on the area of interest. In another variant, non-uniformly scaling is applied asymmetrically based on the area of interest. In another variant, the processor further configured to receive the area of interest in the image. In another variant, the device further comprising the image sensor and a lens.

In yet another aspect, a method of encoding a captured image that improves image resolution processing, the method including accessing a captured image from an image sensor, the captured image associated with a resolution density reflective of an amount of resolution present across the captured image, non-uniformly downsampling the captured image via the resolution density by losing less information at an area of interest than at remaining areas in the image, and encoding the non-uniformly downsampled image.

In one variant, an effective resolution of the non-uniformly downsampled image is less than an effective resolution of the captured image. In another variant, the method further includes increasing a curvature of the resolution density curve relative to an initial curvature. In another variant, the method further includes applying the non-uniformly downsampling symmetrically based on the area of interest. In another variant, the method further includes applying the non-uniformly downsampling asymmetrically based on the area of interest. In another variant, the method further includes receiving the area of interest in the image. In another variant, the method further includes detecting an image with the image sensor.

In yet another aspect, an image capture device that improves image resolution processing, the image capture device including an image sensor capturing an image having a resolution density curve which varies with a viewing angle relative to the image sensor and a processor. The processor configured to non-uniformly downsample the captured image via the resolution density curve by using more information in an area associated with an object of interest in the image than at a remaining area in the image to improve the image resolution processing of the image by the image capture device, and encode the non-uniformly downsampled image.

In one variant, an effective resolution of the non-uniformly downsampled image is less than an effective resolution of the captured image. In another variant, non-uniformly downsampling is applied symmetrically based on the area associated with the object of interest in the image. In another variant, the processor is further configured to receive an indication of the area associated with the object of interest in the image. In another variant, non-uniformly downsampling is applied asymmetrically based on the area associated with the object of interest in the image. In another variant, the processor is further configured to receive an indication of the area associated with the object of interest in the image.

In yet another aspect, a device that improves image resolution processing, the device including a processor and a memory storing one or more instructions configured to be executed by the processor, wherein the one or more instructions cause the processor to receive, from an image sensor, a captured image with an effective native resolution and a resolution density function related to a lens-image sensor geometry, non-uniformly scale the captured image using the resolution density function to improve the image resolution processing of the captured image by the image capture device, wherein more information is used with respect to an object of interest in the captured image than at remaining portions of the captured image, and encode the non-uniformly scaled image.

In one variant, an effective resolution of the non-uniformly scaled image is less than an effective resolution of the captured image. In another variant, a curvature of the resolution density curve is increased relative to an initial curvature. In another variant, non-uniformly scaling is applied symmetrically based on the object of interest in the captured image. In another variant, the processor is further configured to receive an indication of the object of interest in the captured image. In another variant, non-uniformly scaling is applied asymmetrically based on the object of interest in the captured image. In another variant, the processor is further configured to receive an indication of the object of interest in the captured image.

In yet another aspect, a method of encoding a captured image that improves image resolution processing, the method including accessing a captured image from an image sensor, the captured image associated with a resolution density reflective of an amount of resolution present across the captured image, non-uniformly downsampling the captured image via the resolution density by losing less information at a location of an object of interest than at remaining locations in the captured image, and encoding the non-uniformly downsampled image.

In one variant, an effective resolution of the non-uniformly downsampled image is less than an effective resolution of the captured image. In another variant, the method further including increasing a curvature of the resolution density curve relative to an initial curvature. In another variant, the method further including applying the non-uniformly downsampling symmetrically based on the location of the object of interest in the captured image. In another variant, the method further including receiving the location of the object of interest in the captured image. In another variant, the method further including applying the non-uniformly downsampling asymmetrically based on the location of the object of interest in the captured image. In another variant, the method further including receiving the location of the object of interest in the captured image.

In yet another aspect, an image capture device that improves image resolution processing, the image capture device comprising an image sensor capturing an image having a resolution density curve which varies with a viewing angle relative to the image sensor; and a processor. The processor configured to non-uniformly downsample the captured image via the resolution density curve by using more information in an area associated with an object of interest in the image than at a remaining area in the image to improve the image resolution processing of the image by the image capture device; and encode the non-uniformly downsampled image.

In one variant, an effective resolution of the non-uniformly downsampled image is less than an effective resolution of the captured image. In another variant, non-uniformly downsampling is applied symmetrically based on the area associated with the object of interest in the image. In yet another variant, the processor is further configured to receive an indication of the area associated with the object of interest in the image. In a further variant, non-uniformly downsampling is applied asymmetrically based on the area associated with the object of interest in the image. In yet a further variant, the processor is further configured to receive an indication of the area associated with the object of interest in the image.

In yet another aspect, a device that improves image resolution processing, the device comprising a processor; and a memory storing one or more instructions configured to be executed by the processor. The one or more instructions cause the processor to receive, from an image sensor, a captured image with an effective native resolution and a resolution density function related to a lens-image sensor geometry; non-uniformly scale the captured image using the resolution density function to improve the image resolution processing of the captured image by the image capture device, wherein more information is used with respect to an object of interest in the captured image than at remaining portions of the captured image; and encode the non-uniformly scaled image.

In one variant, an effective resolution of the non-uniformly scaled image is less than an effective resolution of the captured image. In another variant, a curvature of the resolution density curve is increased relative to an initial curvature. In yet another variant, non-uniformly scaling is applied symmetrically based on the object of interest in the captured image. In still another variant, the processor is further configured to receive an indication of the object of interest in the captured image. In a further variant, non-uniformly scaling is applied asymmetrically based on the object of interest in the captured image. In still a further variant, the processor is further configured to receive an indication of the object of interest in the captured image.

In yet another aspect, a method of encoding a captured image that improves image resolution processing. The method comprising accessing a captured image from an image sensor, the captured image associated with a resolution density reflective of an amount of resolution present across the captured image; non-uniformly downsampling the captured image via the resolution density by losing less information at a location of an object of interest than at remaining locations in the captured image; and encoding the non-uniformly downsampled image.

In one variant, an effective resolution of the non-uniformly downsampled image is less than an effective resolution of the captured image. In another variant, the method further comprising increasing a curvature of the resolution density curve relative to an initial curvature. In still another variant, the method further comprising applying the non-uniformly downsampling symmetrically based on the location of the object of interest in the captured image. In a further variant, the method further comprising receiving the location of the object of interest in the captured image. In yet a further variant, the method further comprising applying the non-uniformly downsampling asymmetrically based on the location of the object of interest in the captured image. In still a further variant, the method further comprising receiving the location of the object of interest in the captured image.

Other features and advantages of the present disclosure will immediately be recognized by persons of ordinary skill in the art with reference to the attached drawings and detailed description of exemplary implementations as given below.

Figure 1:
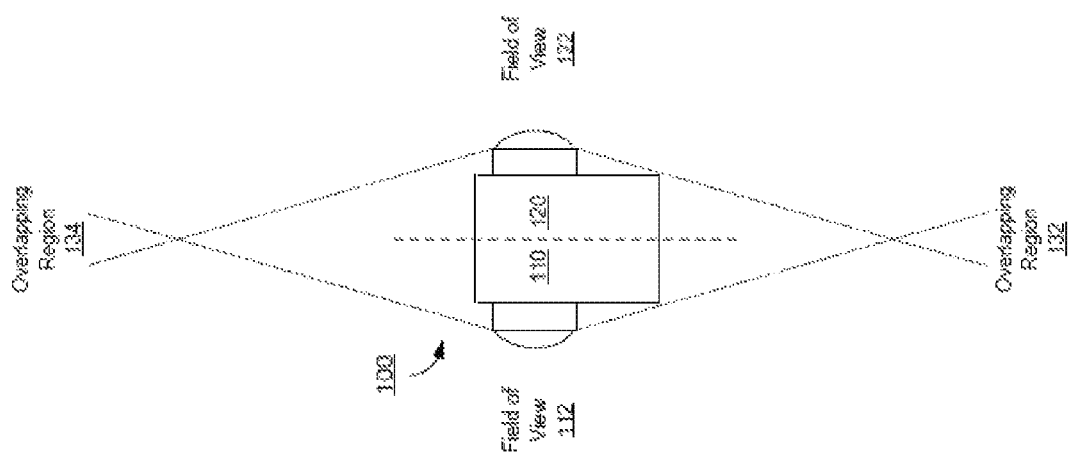
FIG. 1 is a block diagram of one exemplary spherical camera system, in accordance with the principles of the present disclosure.

All Figures disclosed herein are © Copyright 2023 GoPro, Inc. All rights reserved.

DETAILED DESCRIPTION

Implementations of the present technology will now be described in detail with reference to the drawings, which are provided as illustrative examples and species of broader genuses so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while implementations described herein are primarily discussed in the context of spherical images that are captured using a spherical camera system having two (2) cameras (e.g., a front-facing and a rear-facing camera), it is readily appreciated that the principles described herein can be equally applied to other camera configurations that include more, or less cameras. For example, when obtaining panoramic (e.g., 360°) content, three or more images from three or more cameras may be combined (stitched). Additionally, the principles of the present disclosure may be applied to camera systems that include only one (1) camera in certain circumstances (e.g., camera systems with higher resolution image sensors and/or wider field of view (FOV) lenses).

Additionally, while primarily discussed in the context of camera configurations in which each of the centers of view for the respective cameras reside on a given two-dimensional plane, it is readily appreciated that one or more of these cameras can reside such that their center of view is focused at an azimuthal angle (e.g., at 45°), with respect to the given two-dimensional plane for other one(s) of the cameras.

Those of ordinary skill in the related arts will also readily appreciate that symmetric and asymmetric camera configurations can be substituted with equivalent success. For example, a symmetric dual camera system (a Janus configuration) may have fisheye lenses that provide a FOV that is greater than 180°. In asymmetric implementations, the cameras may have different FOV angles; e.g., a higher resolution 195° front-facing camera, and a lower resolution 245° rear-facing camera. Such implementations may be useful to store front and back images according to a common format size, while still providing higher resolution for objects within the field of interest (e.g., the front camera's perspective).

The processes described herein may be performed by a video processing system including at least one processor and a non-transitory computer-readable storage apparatus having a storage medium. The storage medium stores a number of computer-executable instructions thereon, that when executed by the at least one processor, cause the at least one processor to perform the processes described herein. In an embodiment, the video processing system may be partially or wholly implemented in the camera 100 or may be implemented partially or wholly in an external device (e.g., in a computing device that is separate from the camera system 100 that obtained the resultant images). The various methodologies described herein are useful in, for example, the compression, storage and/or transmission of this captured video data. The various methodologies described herein may also be useful in stitching processes associated with captured panoramic images.

Additionally, the processes and methodologies described herein (or portions thereof) may be performed by dedicated computerized system logic, including without limitation, application-specific integrated circuits (ASICs), field-programmable gate arrays (FPGAs), and/or other types of integrated circuits or dedicated computerized logic that may be utilized in addition to, or alternatively from, the aforementioned computer-readable storage apparatus.

These and other variations would be readily apparent to one of ordinary skill given the contents of the present disclosure.

Example Image Capturing System—

FIG. 1 illustrates an embodiment of an example spherical camera system 100 that may include a first camera 110 capturing a first FOV 112 and a second camera 120 capturing a second FOV 122. In one or more implementations, the cameras 110, 120 may be integrated in a back-to-back configuration in which cameras 110, 120 face opposite directions. For example, in operation, the first camera 110 may be a "front-facing" camera 110 such that a user may point the first camera towards an object or scene of interest and the second camera 120 may be a "rear-facing" camera facing in an opposite direction of the front-facing camera 110. While the designations of front-facing and rear-facing are useful in describing the example processes described herein, these designations are arbitrary and the camera system 100 may operate in any orientation.

The fields of view 112, 122 may each include a hyper-hemispherical FOV that captures slightly greater than a 180° range in at least one direction. Because the respective fields of view 112, 122 are hyper-hemispherical (e.g., greater than 180°), they overlap in overlapping regions 132, 134 near their respective boundaries. For example, the fields of view 112, 122 may overlap by n degrees (e.g., where n equals 1°, 5°, 10° or other various degrees of field of view overlap between, for example, a front-facing and rear-facing camera). These overlapping regions 132, 134 may be used for the stitching of separately captured images obtained by the respective cameras 110, 120, as will be described in further detail below. In implementations where the respective FOV ranges are equal for each of the first camera 110 and the second camera 120, these configurations will be referred to hereinafter as symmetric lensing configurations.

In some implementations, the first camera 110 may be configured to capture one range in at least one direction (e.g., 195°), while the second camera 120 may be configured to capture a different range in at least one direction (e.g., 225°). In other words, the first and second cameras 110, 120 may capture differing ranges in their respective fields of view 112, 122 so long as their fields of view overlap in at least one overlapping region 132,134. In implementations where the respective FOV ranges differ for each of the first camera 110 and the second camera 120, these configurations will be referred to as asymmetric lensing configurations.

It will be appreciated that certain camera configurations contain three (or more) cameras; the corresponding field of views for these cameras don't necessarily have to be hyper-hemispherical (i.e., greater than 180°). For example, in an implementation that utilizes three cameras, each of these cameras may capture an image that has a FOV that is greater than a 120° range in at least one direction, so that the resultant images may be stitched together into a full 360° field of view. Implementations that utilize three (or more) cameras may collectively contain either a symmetric lensing configuration or, alternatively, may collectively contain an asymmetric lensing configuration. Similarly, where a complete panorama is not required (e.g., less than a full 360° field of view), fewer cameras with reduced view angles can be used with equivalent success.

The number of pixels in a camera sensor and the FOV are typically "fixed" in a camera system and do not change during use. Generally, the manufacturer will design the camera to suit the intended application(s). For instance, an activity camera that is mobile and rugged will have different capture parameters than a cinema-quality camera designed for e.g., crane mounts or other bulky steadying platforms. Artisans of ordinary skill in the related arts will readily appreciate that the same number of pixels may be used to capture a larger FOV at lower resolution, or a smaller FOV at a higher resolution. For instance, a ten (10) Megapixel (MP) camera sensor that is coupled to a 195° FOV lens provides a higher effective resolution than the same 10 MP camera sensor used for a 245° FOV lens.

As shown in the configuration of FIG. 1, the overlapping regions 132, 134 are fixed and do not change during use. Camera manufacturers may design the camera body with larger or smaller overlap regions; a larger overlap region may be used for better quality image stitching, but can result in an overall drop in image resolution as a result of a lower amount of pixels per degree of FOV (i.e., a lower number of pixels per degree of FOV). Conversely, a smaller overlap region may be used for lower quality image stitching, but may result in an overall increase in image resolution for the captured image.

In other designs, the overlapping regions may be configurable, due to changes in the camera body and/or lens. Video variants may even be able to dynamically change overlap regions during an ongoing capture. For example, video cameras may have optical lens elements that can physically change (even during ongoing capture) e.g., a zoom body that allows the camera to change the focal length. Similarly, static cameras are commonly designed with modular components that can be changed out; for example, different lens attachments can impart different view angles and/or focal lengths. Some cameras may even be constructed to allow different sensors or may selectively use different sensors with different capture characteristics (e.g., switching between optical and IR sensors, or between higher and lower capture quality sensors).

When stitching source images from the two (2) fields of view together, the stitching algorithm should ideally reconcile at least any salient differences between the two (2) source images. For example, objects present within one of overlapping regions 132, 134 will appear slightly different between the two (2) source images due to parallax effects. As used herein, the term "parallax" refers without limitation to a displacement or difference in the apparent position of an object viewed along different lines of sight. Parallax can be mathematically expressed or described with the angle or semi-angle of inclination between the lines of sight. As used herein, the term "perspective" refers to a warping or difference in the apparent dimensions of an object viewed along a line of sight.

As used herein, the term "redundant" within the context of source images, refers without limitation to pixel information that is found in multiple source images. Redundant information may be introduced by parallax effects and can be reconciled together to generate stitched output information. In contrast, as used herein, the term "singular" within the context of source images, refers without limitation to pixel information that is only found in a single source image. Singular information may be caused by blind spots or other occlusions and cannot be reconciled between images without introducing undesirable artifacts (e.g., translucency, warping, or other undesirable visual effects).

Redundantly captured information can be used in the stitching process to improve stitching. For example, sophisticated stitching techniques may attempt to use parallax information to discern distances and/or evaluate depth of the field of view. Still other techniques may intelligently weight or select (to the exclusion of others) singular pixel information from each field of view. However, simple stitching techniques may not differentiate between redundant and singular information; e.g., simple stitching may use a relatively simple cut-and-feather scheme, averaging scheme, or other unilaterally applied filtering technique.

Exemplary Stitching Methodologies—

As used herein, the term "stitching" refers to the process of combining multiple photographic images with overlapping fields of view to produce a stitched image with a substantially larger FOV, higher quality and/or improved resolution. There are a number of image stitching techniques, and most approaches give more seamless results when the overlapping regions between source images have similar capture conditions (e.g., lighting, perspective, color balance, focus). However, some stitching techniques may be able to leverage advanced image processing techniques in regions of overlap to compensate or even benefit from such differences; for example, image information that is captured under a low light exposure can be combined with image information at a higher light exposure to emulate a larger dynamic range of exposure than would otherwise be possible with the camera sensor (also commonly referred to as High Dynamic Range (HDR) photography). Typically, an overlap region of 15%-30% of the total FOV can be used to reconcile and blend away differences between the source images to create an aesthetically "seamless" image.

One technique for quickly stitching together source images is a so-called "cut-and-feather" stitching technique. The first step of a cut-and-feather stitch is to cut (crop out) portions of a source image that extend beyond the stitch. For example, with the Janus configuration of FIG. 1, the stitch is located at the 180° meridian. In some variants, the images may be cropped to favor one of the source images. For example, a first source image may have better image quality through 190° of view, therefore the counterpart second source image is cropped at a corresponding 170°. Moreover, since quality may vary over the image, it is further appreciated that different portions of a source image may be preferentially weighted. For example, a first source image may have a better or worse image quality in a certain subset of the overlap (and treated with a larger or smaller cropping area), whereas the remaining portions of the image are cropped at the default (e.g., 180°).

The resulting cropped images are joined and "feathered." Here, feathering generally refers to, without limitation: blending, filtering, blurring, sharpening, burning, and/or any number of other image processing techniques. More generally, feathering reduces or obfuscates the seam by averaging the differences in pixel values across the seam. Feathering is limited in effectiveness because it only considers the pixel information of the source images, and may introduce some undesirable artifacts into the resulting image (e.g., ghosting, translucency, etc). However, feathering is computationally simple and can be performed with very little processing effort (and can be performed in varying degrees). Feathering is suitable for use on most mobile platforms, and/or where stitching must be done quickly (e.g., streaming video).

Cut operations and feather operations are well understood by artisans of ordinary skill; for example, additional details for cutout and feather type operations are described within "Image Alignment and Stitching: A Tutorial," preliminary draft published Sep. 27, 2004 to Richard Szeliski, which is incorporated herein by reference in its entirety. Still other techniques and/or variations may be made by artisans of ordinary skill in the related arts, the foregoing being purely illustrative.

In some implementations, a cut-and-feather stitch may also provide some information as to the degree of confidence of the stitch. Simple metrics may include, without limitation: the differences in pixel information at the seam prior to feathering (e.g., a sum of difference, or sum of square of difference, or other metric), the amount of feathering (e.g., a sum of changes to pixel values), and/or other quantitative measures of smoothing. More complicated metrics may include e.g., user identified artifacts, holistic measures of the image (including portions outside of the stitch), and/or other identified metrics.

Various other techniques for stitching images may be used consistent with the present disclosure, the foregoing being purely illustrative. Common examples of such techniques include without limitation: cut and feather stitching, depth based stitching, and multi-band stitching.

In some embodiments, the overlap region includes redundant information from multiple source images. For example, in a six (6) sided cube system camera, the corners of the cube will capture three (3) distinct vantages (e.g., a left, a right, and a top perspective). Still other camera systems may incorporate stereo vision (e.g., two or more lenses providing a stereo view) for use in for example, 3D video and photography. In another example, a panning video capture can be divided into individual frames, and then stitched together. Video capture embodiments may use many frames (at many different perspectives) to perform stitching. Additionally, while the following description is presented within the context of visible light, other forms of image capture may be used with equivalent success. Common examples include without limitation, infrared, sonic, radar, lidar, and/or any other form of capture. In some cases, different capture technologies can provide a diversity of information more easily than visual imagery. For example, a sonar/visible light hybrid system can provide depth information and visible light information.

Various different stitching quality metrics may be gathered. Stitching metrics may be based on the original quality of the source images; for example, a blurry or under exposed image provide considerably less information during stitching. Stitching metrics may also quantify the differences between the original source images at the stitch (e.g., the amount of disparity at the stitch, larger disparities result in poorer results). Under such measures, the difference in the stitch may be quantified in the amount of adjustment to pixel values; e.g., larger shifts in color values may indicate poor stitching. In other measures, the difference in the stitch may be quantified by the absolute number of pixels which changed (rather than a measure of pixel information). Additionally, changes to source images may be weighted differently. For example, a source image with dubious image quality (e.g., due to underexposure) may have an underweight effect on the resulting stitch.

Still other stitching metrics may quantify holistic differences between the post-stitch image and its original source images. Stitching that has warping or skewing that appears to be multimodal (with multiple maxima/minima) is unlikely to be attributable to mere differences in perspective and are more likely due to an unintentional "fold-in" stitch (where falsely matched distinct features of the source images were "folded" together into one feature). Similarly, excessive warping or skewing is also undesirable and may indicate problems with the originally captured source images. Some stitching metrics may attempt to quantify undesirable artifacts (e.g., blurriness, sharpness, unusual coloration). More generally, artisans of ordinary skill in the related arts will readily appreciate that virtually any "confidence" metric can be used to convey the quality of the stitched result.

Additionally, it should be recognized that some metrics are specific to a particular application. For example, a video that is constructed from stitched images may experience unusual effects as objects pass through the seam. The individual stitched images may be well stitched on a frame by frame basis; however, when viewed together, an object with a constant velocity may appear to "bump" through the seam. In some cases, such motion may be reflected in subsequent encoding of the resulting video (e.g., motion vectors that are generated during e.g., MPEG encoding). Similarly, in some cases, video of fast moving objects may be more aesthetically pleasing if allowed to retain motion blur rather than being unnaturally "sharpened". Also, 3D applications may need to retain parallax effects and/or focal distance blurring so as to allow for "natural" depth perception. Other application specific considerations will be made apparent to those of ordinary skill in the related arts, given the contents of the present disclosure.

Stitching quality may be localized to a spatial location within the stitched image. For example, consider an object that is occluded from one source image but present in the other. The remaining portions of the stitched image may be well stitched; however, the object itself will be difficult to reconcile into a final stitched image (e.g., whether the object is present or not). Accordingly, the resulting stitched image can identify a low confidence metric that is specific to the location of the object. In this manner, during post-processing, a user could selectively choose to render the obscured object or edit the object out. In a related example, stitching quality may be localized to a temporal location within video frames of images. For example, consider an object that moves at different speeds or that frequently changes direction. The stitched frames may each be well stitched; however, when encoded into a video format, the motion may be irregular and/or jumpy. Stitching that results in unusual motion encoding may imply a lower quality stitch.

Additionally, stitching techniques may be localized to a spatial location within the stitched image. For example, a mobile device may be able to perform more complex stitching techniques (e.g., a depth-based stitch) over certain portions of interest within the image, but use simpler stitching techniques (e.g., a cut-and-feather stitch) over areas which are less important. Selective stitching can be useful to provide better results in reasonable processing times within the constraints of a mobile platform. For example, the user may be able to select portions of the quickly stitched image to check "on-the-spot"; the resulting localized high quality stitching will let the user know whether they "got the shot".

One such example of a complex stitching technique is so-called depth-based stitching which uses object/feature detection and/or stereovision, to identify objects of varying distance or "depth" from the camera system. Based on the inferred depth of the source images and the relative distance and field of views of the corresponding camera system, the effects of parallax can be reduced or removed entirely. Existing solutions for removing parallax may be widely found through relevant literature; for example, the study of isomorphism within projective space (e.g., two equivalent objects) that are induced by an isomorphism of a vector space (e.g., two equivalent lines of sight) is broadly described as "homography".

Complex stitching techniques generally include one or more steps of: (i) determining which pixel coordinates of a first source image correspond to pixel coordinates of another image (alignment), (ii) reconciling differences in redundant pixel values between the two source images, (iii) applying blending filters, and (iv) warping the resulting stitched image to a projection. Various other techniques may be used, the following descriptions being purely illustrative.

Feature based detection can be based on edge detection, surface detection, object recognition, shape recognition, and/or any number of other visual recognition techniques. Additionally, artisans of ordinary skill in the related arts will readily appreciate that any feature matching between two different images, no matter how similar, will have ambiguous features or features which cannot be matched; consequently, most feature detection algorithms can only achieve a best fit based on for example, a sum of differences, sum of squares, or other such metric. Such metrics can also be reported as a confidence metric.

Moreover, as will be further recognized, there are many ways to adjust an image to correct for e.g., parallax and/or blind spots. Adjustments may include, without limitation: warping, blurring or sharpening, selection, and/or averaging pixel information from the source images. For example, changing the perspective of a field of view may be performed by warping or skewing the corresponding field of view. Moreover, identified objects at different distances may be skewed to different degrees corresponding to their distance. Blurring and/or sharpening may be used so to consistently render an object at a particular focal distance. For example, an object that is blurred in one source image but sharp in the other source image (due to different focal distances), may be blurred or sharpened in the aggregate, to give a consistent focal distance. Similarly, objects that are in one source image but not the other (e.g., such as where only one of the cameras has a blind spot) will create a "ghost" or translucent version, if the redundant pixels are directly combined. In such cases, a more accurate rendering can be performed by selecting the pixels from one source image or the other. In still other cases, ghosting or translucency may be a desirable artifact. For example, objects in motion look more natural when rendered with slight ghosting, rather than with crisp lines (crisp edges create a stop-motion effect).

Feature recognition based image stitching operations are well understood by artisans of ordinary skill; for example, additional details for feature based stitching operations are described within "Image Alignment and Stitching: A Tutorial," preliminary draft published Sep. 27, 2004 to Richard Szeliski, previously incorporated herein by reference in its entirety. Still other techniques and/or variations may be made by artisans of ordinary skill in the related arts, the foregoing being purely illustrative.

Various other techniques for re-stitching images may be used consistent with the present disclosure, the foregoing being purely illustrative.

Resolution Density and Scaling Methodologies—

Figure 2A:
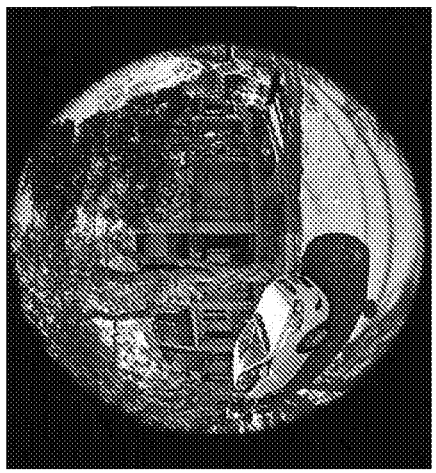
FIG. 2A is a graphical representation of a fisheye projection of a captured scene, in accordance with the principles of the present disclosure.
Figure 2C:
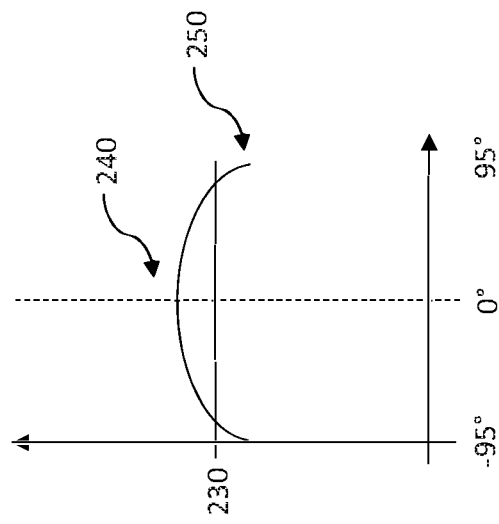
FIG. 2C is a plot of resolution density as a function of angle for the lens of FIG. 2B, in accordance with the principles of the present disclosure.
Figure 2B:
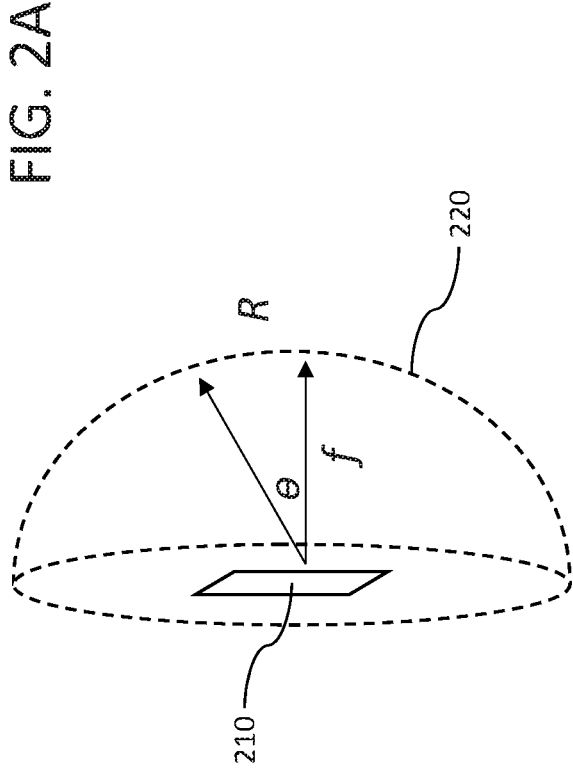
FIG. 2B is a graphical representation of a lens of an exemplary spherical camera system, in accordance with the principles of the present disclosure.
Figure 4:
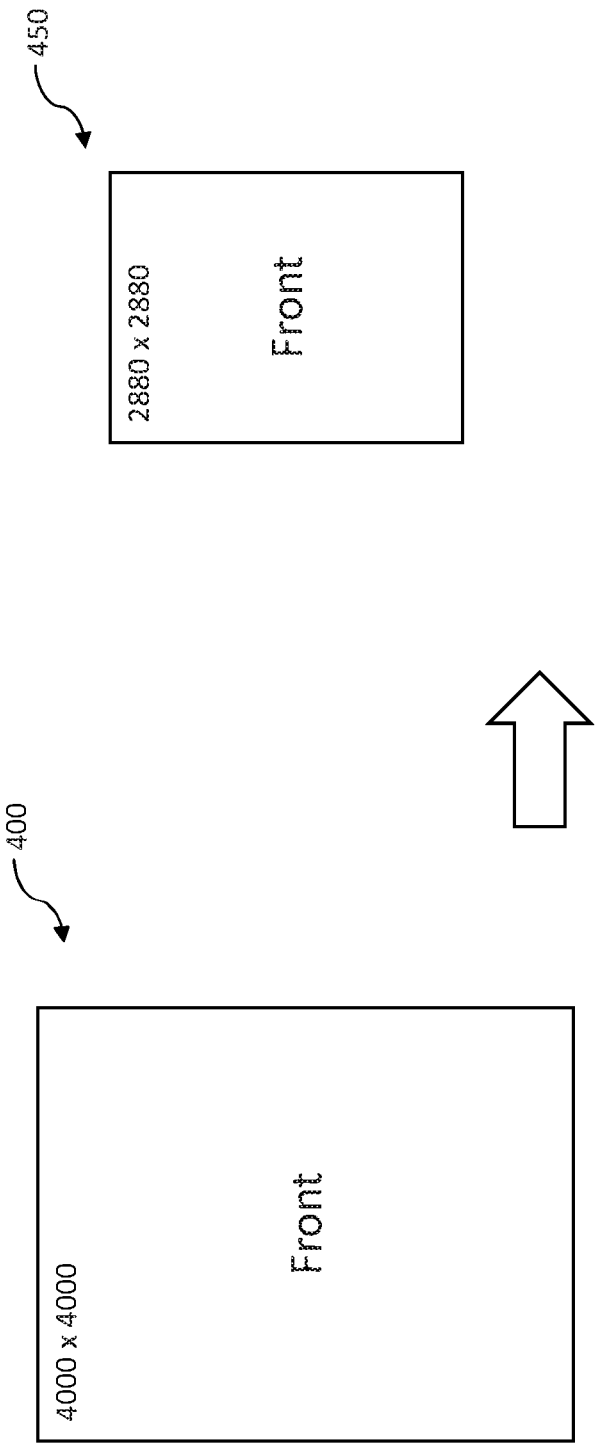
FIG. 4 is a logical representation of prior art scaling techniques for captured panoramic images, in accordance with the principles of the present disclosure.
Figure 4:
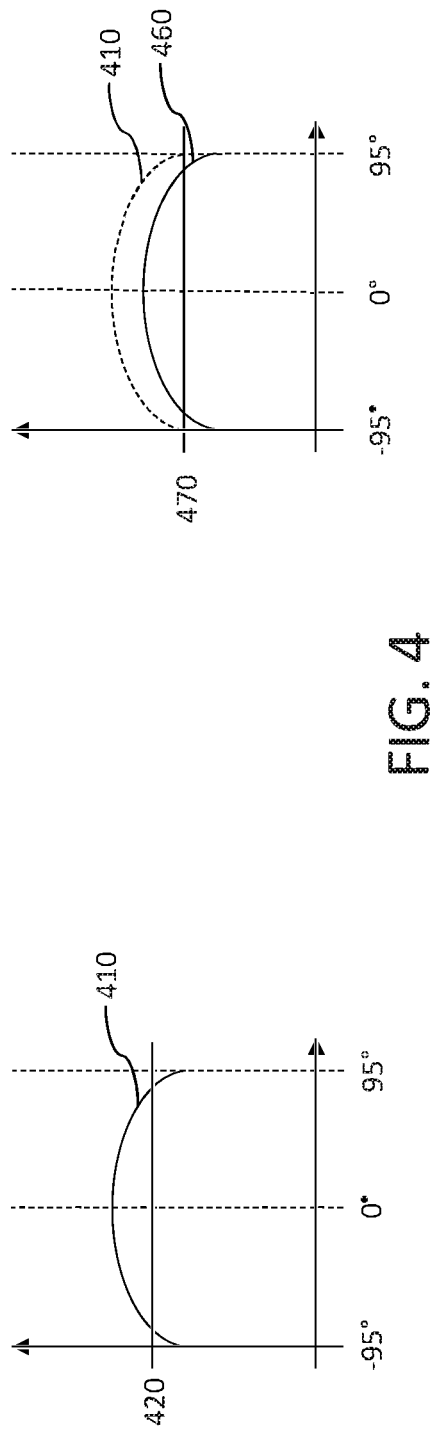
Figure 5:
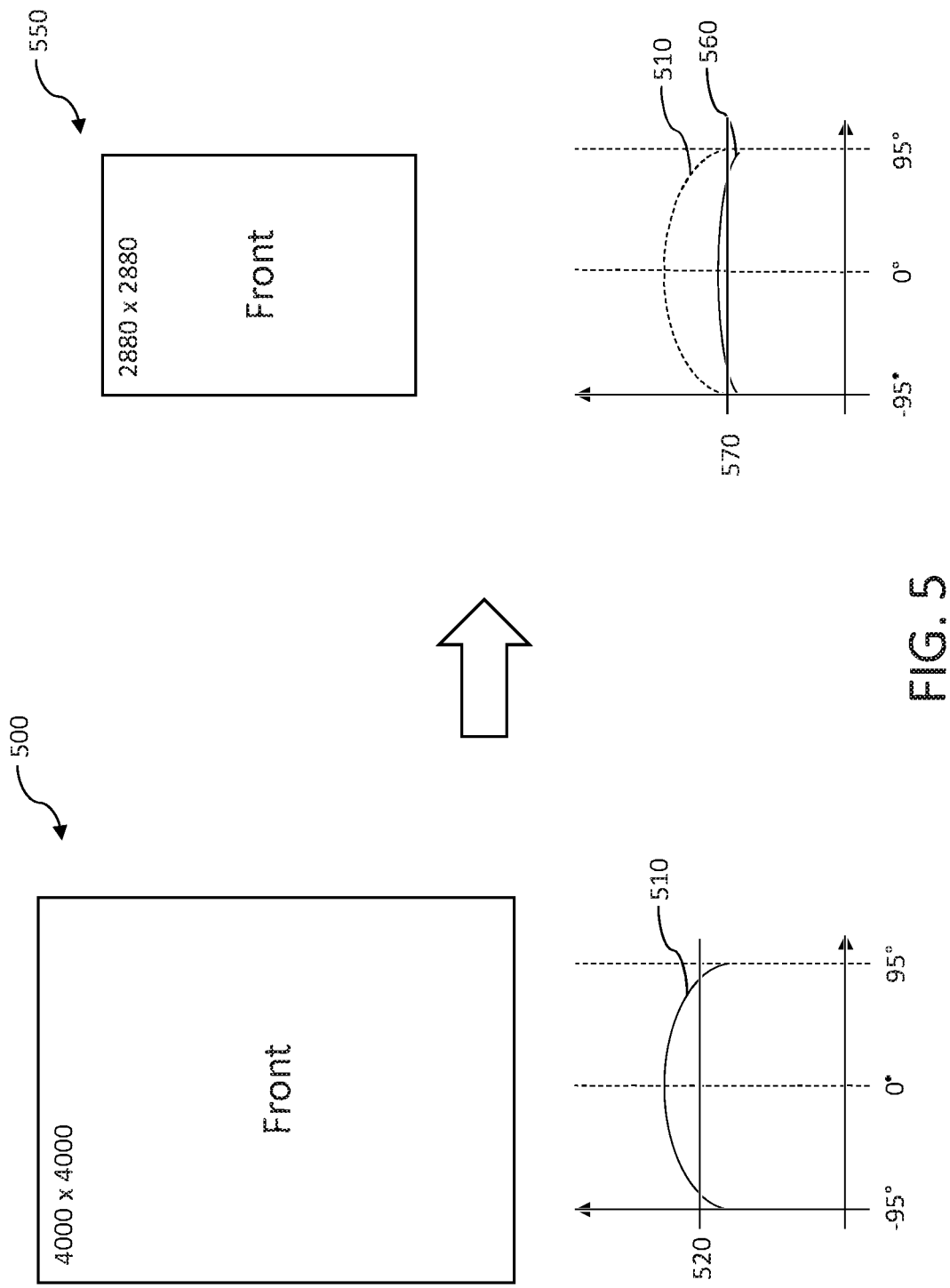
FIG. 5 is a logical representation of one exemplary scaling technique, in accordance with the principles of the present disclosure.
Figure 6:
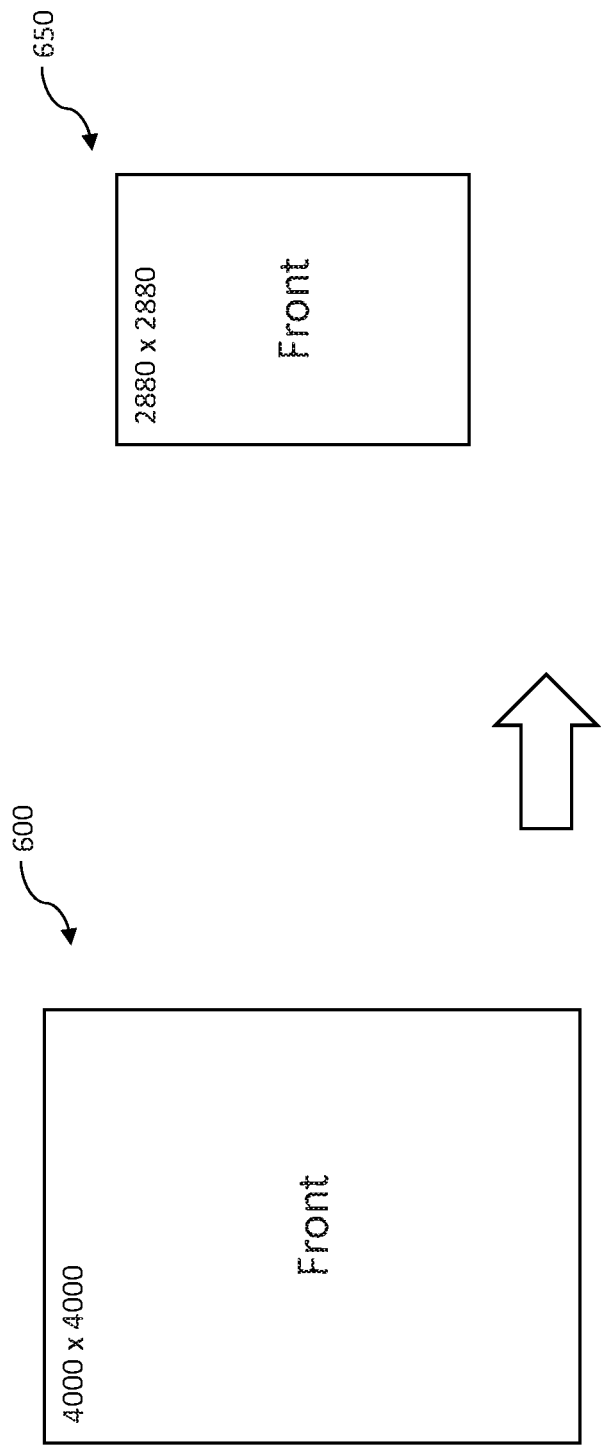
FIG. 6 is a logical representation of another exemplary scaling technique, in accordance with the principles of the present disclosure.

While the embodiments described herein discuss specific resolution examples as are illustrated in, for example, FIGS. 4-6, it would be readily apparent to one of ordinary skill that these specific resolutions are merely exemplary and that other resolutions could be readily substituted with equal success. The following discussion merely being exemplary. Spherical camera systems, such as the spherical camera system 100 shown in FIG. 1, capture images through the use of a fisheye lens. A fisheye lens is an ultra wide-angle lens that produces visual distortion, particularly towards the edges of a capture scene. FIG. 2A illustrates an exemplary captured scene 200 that illustrates the high levels of distortion towards the edges of the fisheye projection and lower levels of distortion towards the center focal point of the fisheye projection. FIG. 2B illustrates the cause of the distortion. In particular, the distortion is caused due to the geometry of the lens 220 as the lens focuses light onto an image sensor 210. Additionally, the geometry of the lens 220 also affects the resolution density of the captured image. For example as can be seen in FIG. 2B, light that enters the lens 220 in a manner that is orthogonal to the image sensor will have the highest amount of resolution. Conversely, light that enters the lens 220 at oblique angles to the image sensor will have lower amounts of resolution. FIG. 2C illustrates an exemplary resolution density as a function of viewing angle for a fisheye lens. As can be seen, the portion 240 of the captured scene at the center of the lens has the highest resolution density, while the portion 250 away from the center of the scene has a comparatively lower resolution density. The average resolution (or effective resolution) is illustrated by line 230. For example, a captured scene with an effective resolution of 4K will actually have a greater than 4K resolution at the center portion 240 of the captured scene, and a lower than 4K resolution at the outer portions 250 of the capture scene.

Figure 3:
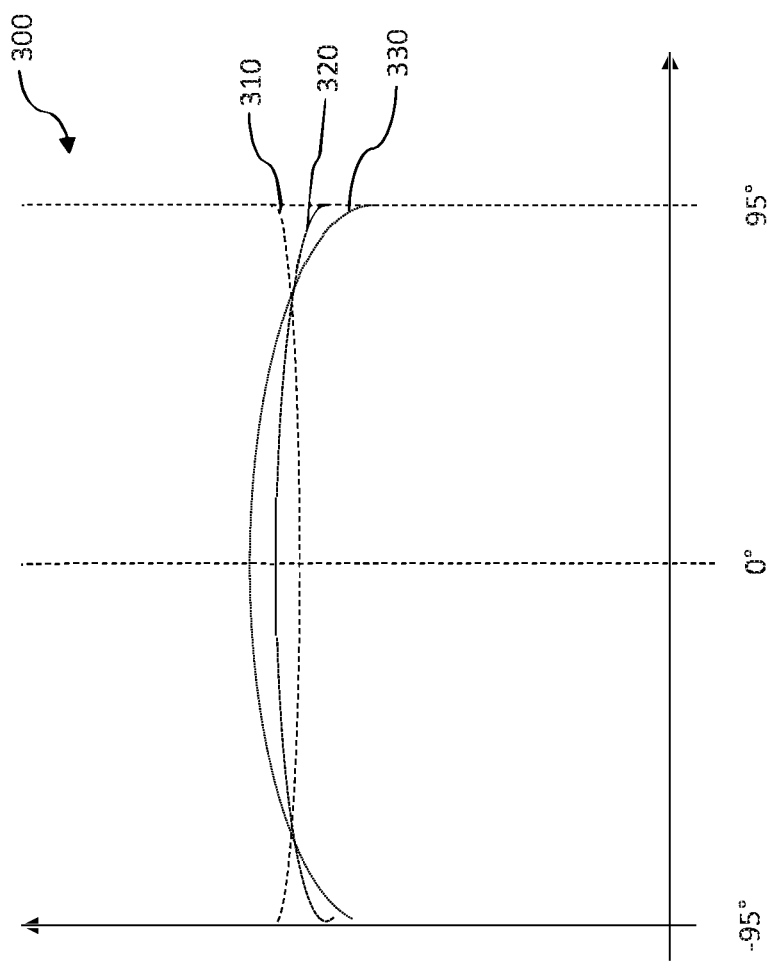
FIG. 3 is a plot of resolution density as a function of angle for a number of differing lenses, in accordance with the principles of the present disclosure.

As discussed elsewhere herein, the resolution density curve is a function of the lens geometry as is shown in FIG. 3. For example, an ideal fisheye lens may have a resolution density as a function of viewing angle that is represented by curve 330. Other lens geometry may have a "flatter" resolution density as represented by curve 320. Yet other lens geometry may have an "inverted" resolution density as represented by curve 310. In the case of inverted resolution density curve 310, the resolution is effectively the highest towards the edges of the captured scene and lowest towards the center of the scene. Contrast this with curves 320, 330 where the resolution density is the lowest towards the edges of the captured scene. It should be noted that the foregoing curves 310, 320, 330 are merely exemplary and that other lens geometries may collectively produce an effectively countless number of resolution density curves.

As discussed supra, traditional encoders (e.g., H.264, HEVC, etc.) have not been optimized for use with panoramic image capture. For example, FIG. 4 illustrates a traditional method for handling panoramic image data for use with these traditional encoders. A spherical camera system may natively capture a scene at a native resolution 400 (e.g., 4000 pixels by 4000 pixels). This native resolution 400 may have a resolution density curve 410 with an effective resolution represented by line 420. This effective resolution 420 may not be suitable for traditional encoders. Accordingly, in prior art approaches the effective resolution 410 needs to be scaled down so as to have an effective resolution curve as indicated by resolution density curve 460 having an effective resolution 470 that is lower than the native effective resolution 420. This scaling is applied uniformly across the captured scene which results in a uniform loss of resolution throughout the captured scene. In the illustrated example, the native resolution 400 (e.g., 4000 pixels by 4000 pixels) has been scaled down to a scaled down resolution 450 (e.g., 2880 pixels by 2880 pixels). This linear scaling reduces the resolution of the captured scene uniformly, meaning that the decrease in resolution at the center of the captured scene is the same as the decrease in resolution at the edges of the captured scene. However, this uniform downsampling has disadvantages. For example, the stitching quality of a panoramic image might benefit by preserving as much information as possible at the edges of a captured scene using the stitching algorithms discussed elsewhere herein. This may be particularly true for more complex stitching techniques.

FIG. 5 illustrates a non-uniform scaling of a captured scene. A spherical camera system may natively capture a scene at a native resolution 500 (e.g., 4000 pixels by 4000 pixels). This native resolution 500 may have a resolution density curve 510 with an effective resolution represented by line 520 and again, this effective resolution 520 may not be suitable for traditional encoders. The effective resolution may need to be scaled down to an effective resolution 570 that is lower than the native effective resolution 520. However, a non-uniform downsampling may be performed such that the resolution density curve 560 has effectively been flattened. In practicality, this means that more information has been lost towards the center of the captured scene and less information has been lost towards the edges of the captured scene. Intuitively, such a flattening may seem undesirable as areas of interest are typically considered to reside in the center of a captured scene; however, this flattened curve 560 actually improves upon the quality of the stitch as more (or all) of the overlapping region resolution has been preserved. In other words, when stitching is performed on the captured images subsequent to encoding (and subsequent decoding) based on this non-uniform downsampling, the stitching quality is improved as compared with a uniform downsampling.

Like FIG. 5, FIG. 6 illustrates a non-uniform scaling of a captured scene. A spherical camera system may natively capture a scene at a native resolution 600 (e.g., 4000 pixels by 4000 pixels). This native resolution 600 may have a resolution density curve 610 with an effective resolution represented by line 620 and again, this effective resolution 620 may not be suitable for traditional encoders. The effective resolution may need to be scaled down to an effective resolution 670 that is lower than the native effective resolution 620. However, unlike the example of FIG. 5, a non-uniform downsampling may be performed such that the resolution density curve 660 has effectively been curved more than the native resolution density curve 610. In other words, more information (e.g., pixels) has been removed from the edges of the panoramic image, while less information has been removed from the center of the image as compared with the example of FIG. 5. Such a non-uniform downsampling may be desirable where the object (or viewport) of interest resides in the center of the image and the stitching quality for the edge of the frame is less of a concern.

FIGS. 5 and 6 are illustrative of examples where the non-uniform downsampling has been applied symmetrically. In other words, FIG. 5 is illustrative of an example where less information has been symmetrically lost from the edges of the frame and FIG. 6 is illustrative of an example where less information has been symmetrically lost from the center of the frame; however, it is appreciated that non-symmetric non-uniform downsampling may be performed in some implementations. For example, if an area of interest resides within a given FOV (e.g., between 0° and 95° as but on non-limiting example), downsampling may be applied asymmetrically such that less information is lost on one side of the captured frame, while more information may be lost on the other side of the frame (e.g., between 0° and −95°). Accordingly, the quality of the stitch may be improved on the side of the frame that has lost less information as compared with the quality of the stitch on the other side of the frame. These and other variants would be readily apparent to one of ordinary skill given the contents of the present disclosure. Such asymmetric non-uniform downsampling may have advantages where, for example, The non-uniform downsampling may be configured according to a predetermined function. For example, this function may be expressed such that no (or very little) resolution is lost in the overlapping portions of the captured panoramic images, while increased resolution is lost in the center of the image. Other functions may be expressed such that more resolution is lost in the overlapping portions of the captured panoramic image, while less resolution is lost in the center of the image during downsampling. These and other variations would be readily apparent to one of ordinary skill given the contents of the present disclosure.

Figure 7A:
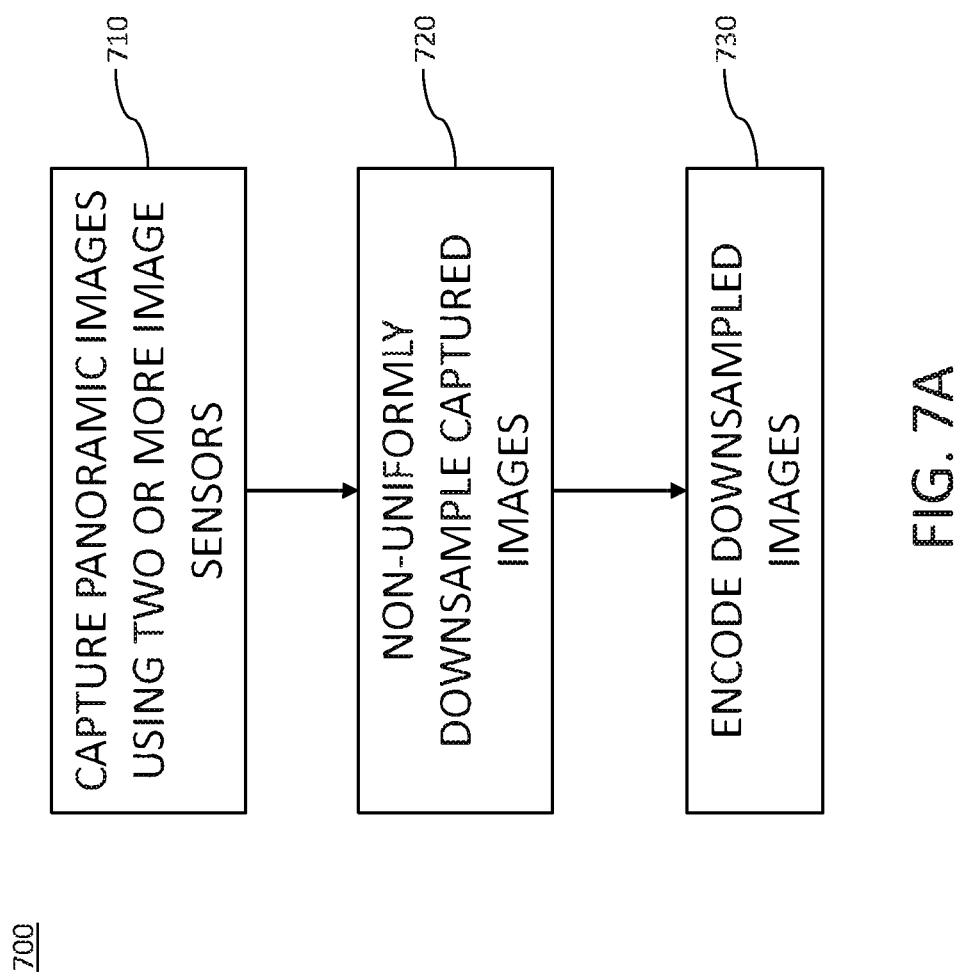
FIG. 7A is a logical flow diagram of one exemplary method for the encoding of downsampled images, in accordance with the principles of the present disclosure.

Referring now to FIG. 7A, one exemplary methodology 700 for the encoding of downsampled images is shown and described in detail. At operation 710, panoramic images are captured using two or more image sensors. At operation 720, the captured images may be non-uniformly downsampled. As discussed elsewhere herein, the reason for this downsampling (or scaling) is resultant from the fact that the native resolution of the captured images are not compatible (or optimized) for use with traditional encoders/decoders. The non-uniform downsampling may be performed in order to optimize a given area of interest within a captured frame. For example, where stitching quality is the primary concern, the non-uniform downsampling may reduce (or eliminate) the amount of pixel information lost within the overlapping regions of a captured panoramic image. In other examples, the non-uniform downsampling may emphasize the reduction of information lost towards the non-overlapping regions of a captured panoramic image. In such an example, a user (or viewer) of the captured image content may desire to preserve pixel information in the center of the captured scene at the expense of a lower quality stitch.

In some instances, a user may desire to apply a plurality of non-uniform downsampling functions to a given captured scene. For example, a number of gradations of emphasis may be applied to a given area of the captured images. One non-uniform downsampling may eliminate pixel information lost within an overlapping region, another non-uniform downsampling may have a relatively large amount of pixel information lost within the overlapping regions, while yet another non-uniform downsampling may reside between the other non-uniform downsampling algorithms applied to the captured scene. Accordingly, subsequent to the image stitching of the captured scene, a user may wish to select the subjectively "best" stitched image. A user may then apply the subjectively best non-uniform downsampling algorithm for other captured panoramic images. At operation 730, the non-uniformly downsampled image is encoded. Notably, the non-uniformly downsampled image may have an effective resolution that is compatible with traditional encoder apparatus.

Figure 7B:
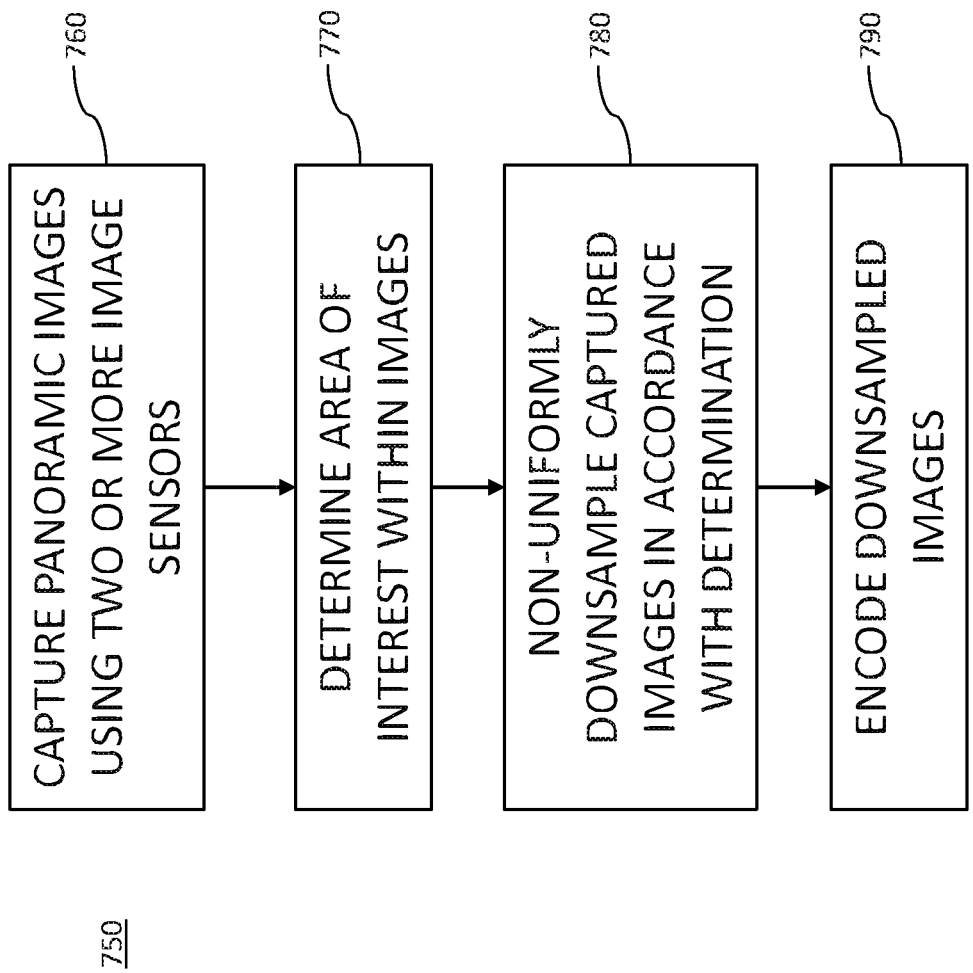
FIG. 7B is a logical flow diagram of another exemplary method for the encoding of downsampled images, in accordance with the principles of the present disclosure.

Referring now to FIG. 7B, another exemplary methodology 750 for the encoding of downsampled images is shown and described in detail. Similar to operation 710 in FIG. 7A, at operation 760 panoramic images are captured using two or more image sensors. At operation 770, an area of interest within the captured panoramic is determined. For example, a user may input into a computing system (such as computing system 800 discussed subsequently herein) an area of interest within the captured panoramic image. In some implementations, a user may indicate an area of interest that resides close (or within), the stitch line of the panoramic image. In other implementations, a user may indicate an area of interest that resides away from the stitch line of the panoramic image. This determination at operation 770 may occur on a per-frame basis, or may occur on some other basis. For example, a user may indicate that a given area of interest is desired for time $t_1$ to time $t_{50}$, as but one non-limiting example.

At operation 780, the captured images are non-uniformly downsampled in accordance with the determination at operation 770. For example, where a user has indicated that an area of interest is located near (or on) the stitch line of the captured panoramic image, the non-uniform downsampling may preserve information in the overlapping regions of the captured panoramic image, while more aggressively reducing the amount of information located in the non-overlapping regions. Conversely, where a user has indicated that an area of interest is located away from the stitch line of the captured panoramic image, the non-uniform downsampling may preserve information in the non-overlapping regions (e.g., to improve image quality), while more aggressively reducing the amount of information located in the overlapping regions. These and other variations would be readily understood to one of ordinary skill given the contents of the present disclosure. At operation 790, the non-uniformly downsampled image is encoded. The non-uniformly downsampled image may have an effective resolution that is compatible with traditional encoder apparatus.

Exemplary Apparatus—

Figure 8:
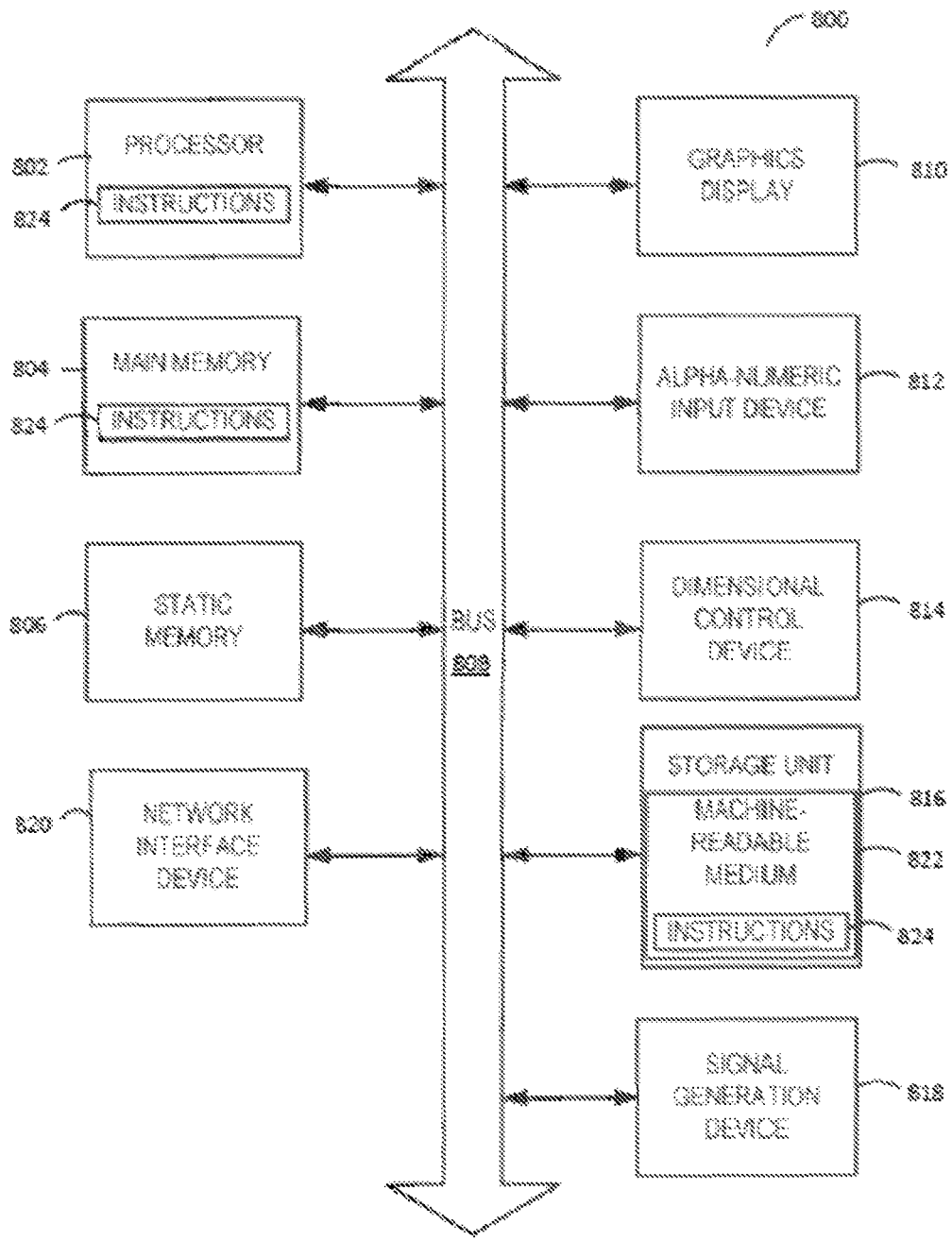
FIG. 8 is a block diagram of an exemplary implementation of a computing device, useful in performing the methodologies described herein.

FIG. 8 is a block diagram illustrating components of an example computing system able to read instructions from a computer-readable medium and execute them in one or more processors (or controllers). The computing system in FIG. 8 may represent an implementation of, for example, the video processing device for performing the non-uniform downsampling processes described herein.

The computing system 800 can be used to execute instructions 824 (e.g., program code or software) for causing the computing system 800 to perform any one or more of the methodologies (or processes) described herein. In some implementations, the computing system 800 operates as a standalone device or a connected (e.g., networked) device that connects to other computer systems. The computing system 800 may include, for example, a personal computer (PC), a tablet PC, a notebook computer, or other device capable of executing instructions 824 (sequential or otherwise) that specify actions to be taken. For example, in some implementations the computing system 800 may include an image capture device (e.g., a GoPro Fusion camera or other panoramic image capture device). In another embodiment, the computing system 800 may include a server. In a networked deployment, the computing system 800 may operate in the capacity of a server or client in a server-client network environment, or as a peer device in a peer-to-peer (or distributed) network environment. Further, while only a single computer system 800 is illustrated, a plurality of computing systems 800 may operate to jointly execute instructions 824 to perform any one or more of the methodologies discussed herein.

The example computing system 800 includes one or more processing units (generally processor apparatus 802). The processor apparatus 802 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system 800 also includes a main memory 804. The computing system 800 may include a storage unit 816. The processor 802, memory 804 and the storage unit 816 may communicate via a bus 808.

In addition, the computing system 800 may include a static memory 806, a display driver 810 (e.g., to drive a plasma display panel (PDP), a liquid crystal display (LCD), or a projector). The computing system 800 may also include input/output devices, e.g., an alphanumeric input device 812 (e.g., touch screen-based keypad or an external input device such as a keyboard), a dimensional (e.g., 2-D or 3-D) control device 814 (e.g., a touch screen or external input device such as a mouse, a trackball, a joystick, a motion sensor, or other pointing instrument), a signal capture/generation device 818 (e.g., a speaker, camera, and/or microphone), and a network interface device 820, which also are configured to communicate via the bus 808.

Embodiments of the computing system 800 corresponding to a client device may include a different configuration than an embodiment of the computing system 800 corresponding to a server. For example, an embodiment corresponding to a server may include a larger storage unit 816, more memory 804, and a faster processor 802 but may lack the display driver 810, input device 812, and dimensional control device 814. An embodiment corresponding to an action camera may include a smaller storage unit 816, less memory 804, and a power efficient (and slower) processor 802 and may include multiple camera capture devices 818.

The storage unit 816 includes a computer-readable medium 811 on which is stored instructions 824 (e.g., software) embodying any one or more of the methodologies or functions described herein. The instructions 824 may also reside, completely or at least partially, within the main memory 804 or within the processor 802 (e.g., within a processor's cache memory) during execution thereof by the computing system 800, the main memory 804 and the processor 802 also constituting computer-readable media. The instructions 824 may be transmitted or received over a network via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store the instructions 824. The term "computer-readable medium" shall also be taken to include any medium that is capable of storing instructions 824 for execution by the computing system 800 and that cause the computing system 800 to perform, for example, one or more of the methodologies disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "computing device", includes, but is not limited to, personal computers (PCs) and mini-computers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "camera" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed is:

1. An image capture device that improves image resolution processing, the image capture device comprising:
   an image sensor capturing an image having a resolution density curve which varies with a viewing angle relative to the image sensor; and a processor configured to:
  non-uniformly downsample the captured image via the resolution density curve by using more information in an area associated with an object of interest in the image than at a remaining area in the image to improve the image resolution processing of the image by the image capture device; and
  encode the non-uniformly downsampled image.

2. The image capture device of claim 1, wherein an effective resolution of the non-uniformly downsampled image is less than an effective resolution of the captured image.

3. The image capture device of claim 2, wherein non-uniformly downsampling is applied symmetrically based on the area associated with the object of interest in the image.

4. The image capture device of claim 3, wherein the processor is further configured to:
  receive an indication of the area associated with the object of interest in the image.

5. The image capture device of claim 1, wherein non-uniformly downsampling is applied asymmetrically based on the area associated with the object of interest in the image.

6. The image capture device of claim 5, wherein the processor is further configured to:
  receive an indication of the area associated with the object of interest in the image.

7. A device that improves image resolution processing, the device comprising:
  a processor; and
  a memory storing one or more instructions configured to be executed by the processor, wherein the one or more instructions cause the processor to:
    receive, from an image sensor, a captured image with an effective native resolution and a resolution density function related to a lens-image sensor geometry;
    non-uniformly scale the captured image using the resolution density function to improve the image resolution processing of the captured image by the image capture device, wherein more information is used with respect to an object of interest in the captured image than at remaining portions of the captured image; and
    encode the non-uniformly scaled image.

8. The device of claim 7, wherein an effective resolution of the non-uniformly scaled image is less than an effective resolution of the captured image.

9. The device of claim 7, wherein a curvature of the resolution density curve is increased relative to an initial curvature.

10. The device of claim 9, wherein non-uniformly scaling is applied symmetrically based on the object of interest in the captured image.

11. The device of claim 10, wherein the processor is further configured to:
  receive an indication of the object of interest in the captured image.

12. The device of claim 7, wherein non-uniformly scaling is applied asymmetrically based on the object of interest in the captured image.

13. The device of claim 12, wherein the processor is further configured to:
  receive an indication of the object of interest in the captured image.

14. A method of encoding a captured image that improves image resolution processing, the method comprising:
  accessing a captured image from an image sensor, the captured image associated with a resolution density reflective of an amount of resolution present across the captured image;
  non-uniformly downsampling the captured image via the resolution density by losing less information at a location of an object of interest than at remaining locations in the captured image; and
  encoding the non-uniformly downsampled image.

15. The method of claim 14, wherein an effective resolution of the non-uniformly downsampled image is less than an effective resolution of the captured image.

16. The method of claim 14, further comprising:
  increasing a curvature of the resolution density curve relative to an initial curvature.

17. The method of claim 16, further comprising:
  applying the non-uniformly downsampling symmetrically based on the location of the object of interest in the captured image.

18. The method of claim 14, further comprising:
  receiving the location of the object of interest in the captured image.

19. The method of claim 14, further comprising:
  applying the non-uniformly downsampling asymmetrically based on the location of the object of interest in the captured image.

20. The method of claim 19, further comprising:
  receiving the location of the object of interest in the captured image.

* * * * *